T. HUTCHINSON.
Ditching Plow.
No. 32,997
Patented Aug 6. 1861
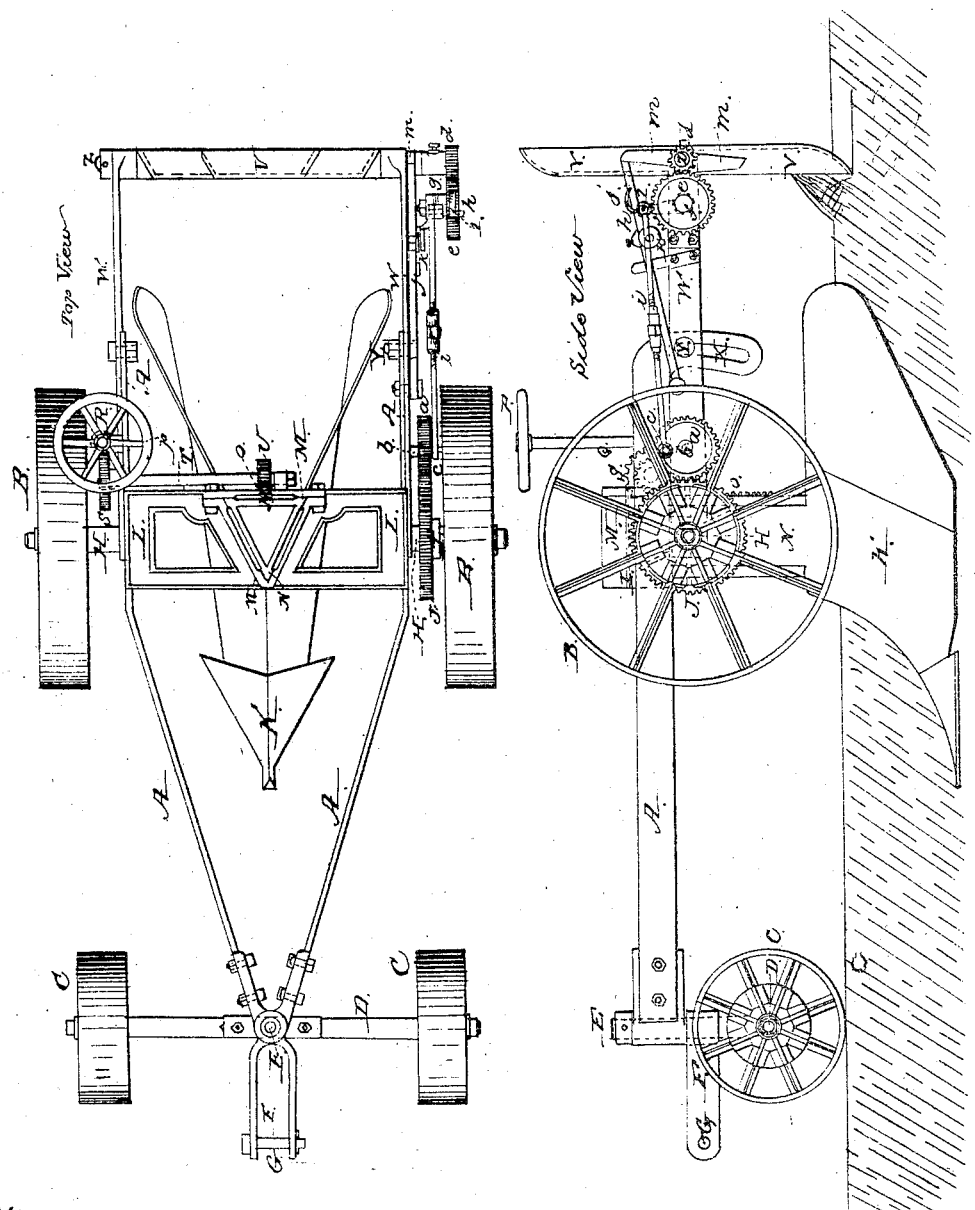

UNITED STATES PATENT OFFICE.

THOMAS HUTCHINSON, OF GREEN POINT, NEW YORK.

IMPROVEMENT IN EXCAVATORS.

Specification forming part of Letters Patent No. 32,997, dated August 6, 1861.

*To all whom it may concern:*

Be it known that I, THOMAS HUTCHINSON, of Green Point, Long Island, in the State of New York, have invented a new and useful machine for excavating holes in the earth at regular intervals for the reception of sugar-cane or other plants or seeds, or for other purposes; and I do hereby declare that the following is a full and exact description thereof, reference being had to the accompanying drawings, and to the letters of reference marked thereon.

The nature of my invention consists in forming a machine to run on wheels and be worked by animal or other power for the purpose of more rapidly and cheaply excavating holes of uniform size and at regular intervals in the ground for agricultural or other purposes, such as planting, &c.; and I give practical effect to my idea by mechanically combining in one machine a double-mold plow acting continuously, producing a straight furrow, and throwing the excavated earth equally on both sides of its center, which plow I call the "forward excavator," with a scoop-shaped implement, which I call the "after excavator," lying behind the forward excavator and at right angles to the direction of motion of the machine—that is to say, across the furrow made by the forward excavator. This scoop-shaped implement, by an alternate action, excavates the holes at regular intervals, and in so doing deposits between the holes the earth therefrom excavated, and in a direction at right angles to the deposit from the forward excavator. Thus each hole will be surrounded on its four sides with a bank or mound of earth, ready to be refilled after the plants or seeds are planted. The after excavator is alternately in and out of action, and this effect is produced by appropriate mechanism deriving the power to work it from the movement of the wheels on which the machine is mounted. By appropriate mechanism, also, I control and regulate the action of the machine in such manner as to cause at will the forward excavator to make a furrow of any desirable depth, or no furrow at all, by raising it entirely above the level of the ground, and to form at will, by the after excavator, holes of any desirable length, breadth, and depth, and distance apart, or to entirely withdraw the after excavator from action; and I so mount the machine that it may be easily drawn and guided by the power working it. I have thus provided every necessary means for working and for adjustment.

To enable others skilled in the art to make and use my invention, I will proceed to describe its construction and operation.

The machine consists of a frame, A, of iron or wood, mounted on two main driving-wheels, B, of any convenient diameter and width of face, and on two steering-wheels, C, of any convenient diameter and width of face, revolving on their fixed axle D, to which axle the frame A is connected by the vertical pivot E, in such a manner that the said axle may freely assume any direction beneath the frame A for the purpose of guiding the machine.

The yoke F, to which the power is applied, is rigidly fastened to the fixed axle D, so as to be in effect a portion of it and capable of controlling its direction. The draft pole for the cattle is placed between the jaws of the yoke F, to which it is connected by the horizontal pin G, thus allowing the pole a free vertical vibration, while its lateral movement guides the machine in any required direction.

The main driving-wheels B revolve freely on two fixed axles, H and H, which axles are rigidly fastened to the frame A. An extension, I, is formed on the inner side of the hub of one of the driving-wheels B, and on this extension the toothed wheel J is firmly fastened. From toothed wheel J the power is taken to work the mechanism which regulates and controls the action of the after excavator.

The forward excavator, K, is carried by a cross-piece, L, appropriately shaped, with a central socket or guide, M. The said cross-piece extends between and is firmly fastened to the two opposite sides of the frame A. The forward excavator, K, is made in the form of a double-mold plow of the least resistance in passing through the ground. Its principal use in the machine is to make in advance of the after excavator a continuous straight furrow, and deposit the earth thus excavated in equal portions upon either side of it, thereby lessening the labor of the after excavator by loosening up the earth, partially excavating the same, and removing any obstacles, such as stones, roots, &c. A vertical projection, N, carrying a toothed rack, O, is made on the upper part of the forward excavator, K, to fit within the socket or guide M, constructed in the cross-piece, L, so that the said excavator may be moved vertically. To produce this movement there is a hand-wheel, P, fastened rigidly upon the vertical shaft Q, the lower end of which carries a worm, R, geared into a worm-wheel, S, fastened rigidly upon the outer end of the horizontal shaft T, upon whose inner end is rigidly fastened the toothed wheel U, working into the rack O. The shafts Q and T turn freely in boxes sustained by brackets upon the frame and cross-piece. By turning the hand-wheel P the forward excavator, K, can be raised or lowered at will, thereby regulating the depth of furrow made by it, or elevating it entirely clear of the ground when the machine turns around at the end of a furrow or is moving from place to place without excavating.

Instead of the mechanism just described for raising the forward excavator, the hand-wheel P, vertical shaft Q, and worm R may be placed at the center of the machine, so that the worm will engage the teeth of the rack O, and the horizontal shaft T, with the wheels S and U, be dispensed with.

The after excavator, V, follows the forward excavator, and is, together with the mechanism regulating and controlling it, supported upon the two side levers, W and W. These levers are pierced at one end with a hole of the diameter of the shafts H and H, which shafts are slipped through them, so that the levers can vibrate freely vertically on said shafts when desired. For the purpose of rigidly fixing the said levers, when desired, and in the proper position, the after end of the frame A is formed into the slot X, concentric to the axis of the shafts H H, and the said levers, being arranged to slide over this slot, can be immovably fastened to the frame A by means of the clamp-bolt Y, movable up and down in the slot X. By means of the levers W and W, the slot X, and the clamp-bolt Y the depth of hole made by the after excavator, V, can be regulated as desired.

The after excavator is made of two or more scoop-shaped implements firmly fastened upon the same hub, and upon this hub are also fastened the arms $m$ and $m$, controlling its movement. The scoops are flat, wide at the hub, and tapering toward their extremity, so as to excavate a hole broader on the top than on the bottom, in order that the sides may stand and the form be better adapted for collecting and retaining moisture. The holes formed by the scoops will be rectangular in top view. The hub to which the scoops are attached is hollow and mounted on the horizontal axle Z, so as to be capable of rotation around said axis, the extremities of which revolve in boxes supported in the side levers, W and W. The axle Z lies at right angles to the direction in which the machine moves. The scoops revolve in the same direction that the machine moves—that is to say, forward.

The movements of the after excavator, V, are caused and controlled as follows, namely:

Upon the hub I of one of the main driving-wheels B is rigidly fastened the toothed wheel J, geared into the toothed wheel $a$, which is free to revolve on its axle $b$, supported on the side lever, W. Into the periphery of wheel $a$ is screwed the pin $c$. On the outer end of axle Z there is rigidly fastened the toothed wheel $d$, gearing into the toothed wheel $e$, which revolves freely on its axle $f$, supported on the side lever, W. Between the wheel $e$ and the side lever, W, is the arm $g$, supported on the axle $f$, and free to vibrate on it. Through the upper end of this arm passes the pin $h$, and this pin and pin $c$ are joined by the connecting-rod $i$, which has an open hook upon the pin $h$. The inner end of pin $h$ is bent to project under the lock-lever $j$, one end of which is pivoted upon the side lever, W, and serves as a trip-pin by raising friction-pulley $k$ and lock-lever $j$ to set free the arm $m$. On the outer end of pin $h$ is placed the pawl $l$, gearing into and giving motion to wheel $e$. The toothed wheel $e$, being geared into the toothed wheel $d$, rigidly fastened upon the axle Z, gives motion to the after excavator, V, when on its outward stroke, until it has brought one of the scoops in contact with the earth. At this instant the pin $c$ crosses its outer center and draws back the pawl $l$ on its return-stroke. By the forward movement of the machine the after excavator is made to attain its full depth in the earth, at which instant the arm $m$ comes in contact with the lever $j$, by which means the movement of the after excavator, V, is arrested and the excavating-scoop retained in a vertical position during the time necessary to make the desired length of hole. Then the trip-pin $h$ comes in contact with the friction-pulley $k$, lifts the lock-lever $j$, and, setting free the arm $m$, allows the excavator V to rotate forward by the resistance of the earth. The pin $c$, having crossed its inner center, returns on its outward stroke, turning the next scoop into the earth, and so on continually. When the excavator V is not required to act, the pawl $l$ is thrown back out of gear.

Any desired distance from center to center of hole can be made by changing the diameter of the toothed wheel $a$, slipping back or forward its axle $b$, to allow the change, and shortening or lengthening the connecting-rod $i$ accordingly by means of a turn-buckle.

Instead of the immediately-above-described mechanism for controlling the action of the after excavator, there may be used, if it be desired to bring this excavator more quickly to its work, the following modification—namely, the lock-lever $j$ to be extended on the other side of its fulcrum, or the pivot by which it is attached to the side lever, W, and made to pass beneath the hub of the toothed wheel $a$. Into this wheel there is to be inserted a trip-pin, designed to trip the lock-lever $j$ at precisely the proper point in each revolution, thereby setting free the arm $m$. The hook of rod $l$ would then be lifted from the pin $h$ by a pin inserted for that purpose in lock-lever $j$ and projecting beneath rod $i$, so that both rod $i$ and lock-lever $j$ would be disengaged by the same movement. On the back of arm $g$ there is to be secured a circular or involuted spring, the upper end of which takes hold of pin $h$. This spring, when set loose, will bring the after excavator, V, into the earth. After the pin $c$ in wheel $a$ crosses its outer center the rod $i$, by means of its hook, takes hold of the pin $h$ and brings it back to its inner position, when it is again tripped and next scoop brought into action, and so on continually.

What I claim as my invention, and desire to secure by Letters Patent, is—

1. The combination of the plow K with the scoop V, and the mechanism, as described, by which the plow K is elevated or lowered.

2. The scoop V, in combination with the plow K, and the mechanism, as described, by which the movements of the scoop are regulated and controlled.

Green Point, Long Island, New York, September 10, 1860.

THOS. HUTCHINSON.

Witnesses:
W. E. EVERETT,
B. F. ISHERWOOD.